March 14, 1950 W. P. LEAR 2,500,691
MECHANICAL ACTUATOR SYSTEM
Filed Jan. 22, 1945 3 Sheets-Sheet 1

INVENTOR.
WILLIAM P. LEAR
BY
Richard A. Marsa
ATTORNEY

March 14, 1950 W. P. LEAR 2,500,691
MECHANICAL ACTUATOR SYSTEM
Filed Jan. 22, 1945 3 Sheets-Sheet 3

INVENTOR.
WILLIAM P. LEAR
BY Richard A. Marse
ATTORNEY

Patented Mar. 14, 1950

2,500,691

UNITED STATES PATENT OFFICE 2,500,691

MECHANICAL ACTUATOR SYSTEM

William P. Lear, North Hollywood, Calif., assignor, by mesne assignments, to Lear, Incorporated, Grand Rapids, Mich., a corporation of Illinois Application January 22, 1945, Serial No. 573,979

12 Claims. (Cl. 244—42)

This invention relates to actuators and more particularly to an automatic actuator unit particularly adapted for controlling the position of a movable element such as the wing flap of an airplane in accordance with external stresses exerted thereon.

Airplanes are generally equipped with movable flaps which are normally disposed in the plane of the main wing surface. These flaps, in order to control the operation of the wing flap, are movable from such normal or retracted position to an extended position. Under certain conditions, when a wing flap is moved to a projected or extended position, the stress thereon may be greater than a predetermined value and also may be such as to affect the stability of the aircraft. When this occurs, it is necessary that the wing flap be retracted to reduce the stress exerted on the flap and restore stability to the aircraft.

The movement of these wing flaps has hitherto been under the manual control of the pilot. The wing flaps have been actuated, under remote control, by suitable actuating systems, either hydraulic or electric. Due to the vulnerability of hydraulic systems to gun fire, electric actuator systems have come into relatively wide use. The present invention comprises an automatic wing flap actuator unit which arrests extending movement of the wing flap when the stress thereon attains a preselected value. If the stress on the wing flap continues to increase and attains a higher predetermined value, the actuator unit automatically retracts the wing flap until such time as the stress thereon has decreased a definite amount below such higher predetermined value.

It is among the objects of this invention to provide an actuator unit for automatically controlling the position of an airplane wing flap with respect to the main wing surface in accordance with the amount of stress on the wing flap; to provide an actuator incorporating torque-responsive devices for effecting automatic control of the position of a member operated by the actuator; to provide an automatic actuator unit which may be incorporated with other actuator units in a synchronizing arrangement whereby all the actuator units automatically operate in synchronism; to provide a small compact automatic wing flap actuator unit; to provide a linear actuator including an extensible screw, a rotatable nut and anti-friction means disposed between the screw and the nut; to provide a motor driven actuator including a torque transmission unit between the motor and the actuator effective to transmit torque from the motor to the actuator and to lock the actuator against movement upon application of reverse torque to the actuator; to provide a novel switch unit for automatically controlling the operation of a motor driven actuator; and to provide a novel, simple, reliable and automatic actuator system.

These and other objects, advantages and features of the invention will be apparent from the following description and the accompanying drawings. In the drawings.

Figure 2:
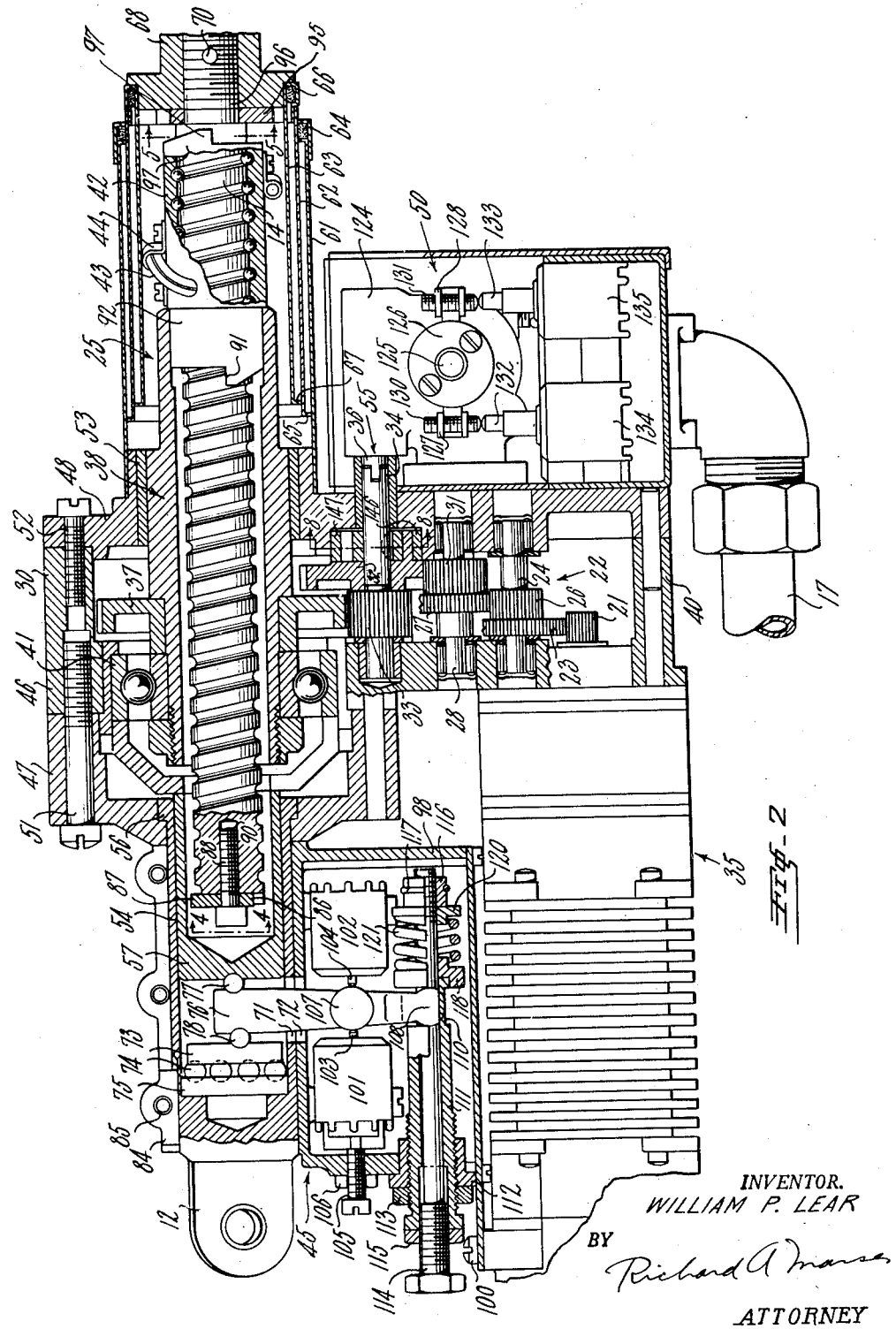
Fig. 2 is an enlarged side elevational view, partly in section of the actuator shown in Fig. 1.
Figure 4:
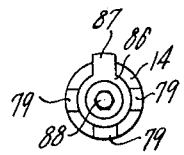
Figure 5:
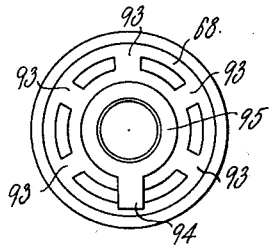

Figs. 4 and 5 are views, taken on the lines 4—4 and 5—5, respectively, of Fig. 2, showing adjustable stop means for mechanically setting the limits of operation of the actuator.

Figure 6:
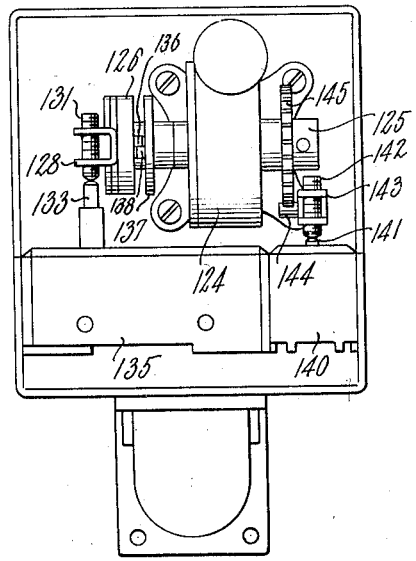

Fig. 6 is an end elevational view of a switch unit forming part of the invention.

Figure 7:
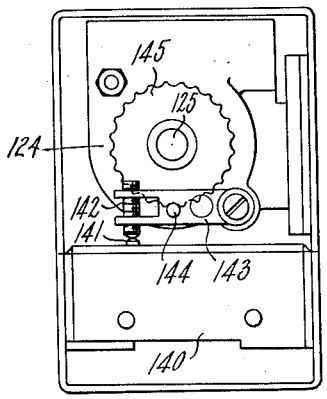

Fig. 7 is a side elevational view of the switch unit shown in Fig. 6.

Figure 8:
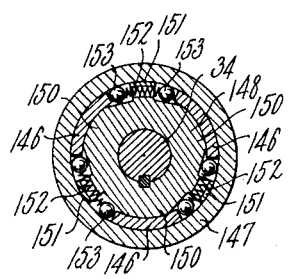

Fig. 8 is a view on the line 8—8 of Fig. 2, showing a torque transmission unit incorporated in the actuator.

Fig. 9 is a schematic wiring diagram illustrating an automatic control system for the actuator unit.

Generally speaking, the present invention comprises a motor driven actuator including a ball bearing jack screw consisting of a relatively non-rotatable screw and a rotatable nut with ball bearings disposed between the screw and nut. The jack screw is mounted in a housing and is linearly movable thereof a limited amount when the torque on the jack screw attains preselected values. A pair of stop means are adjustably secured to either end of the screw for cooperation with abutments on the rotatable nut to mechanically limit the linear movement of the screw relative to the nut. An electric motor is coupled to the rotatable nut through reduction gearing including a torque-transmission unit for transmitting torque from the motor to the actuator in either direction but effective to lock the actuator against movement upon application of reverse torque to the actuator in either direction. Energization of the motor is automatically controlled by a pair of torque-responsive switches which are selectively operable by such limited movement of the screw jack linearly of the housing when the torque on the jack attains preselected values. When the torque on the actuator attains a first preselected value, one of the switches is opened to prevent further extending movement of a wing flap connected to the actuator. If the torque attains a higher predetermined value, the other switch is closed to energize the motor in a direction to effect retraction of the wing flap connected to the actuator.

A switch unit is suitably coupled to the reduction gearing connecting the motor to the actuator and includes a pair of limit switches and novel operating means for opening the limit switches to deenergize the motor at either limit of operation of the actuator. The switch unit also includes a third switch and means for periodically opening and closing the same to provide current impulses for the motor whereby the motor may be incorporated in a synchronizing system of the type described and claimed in the copending application of Schall et al. Serial No. 545,330, filed July 17, 1944, for "Anti-disparity motor control system," now issued as Patent No. 2,425,442 on August 12, 1947, and assigned to the assignee of the present invention.

Figure 1:
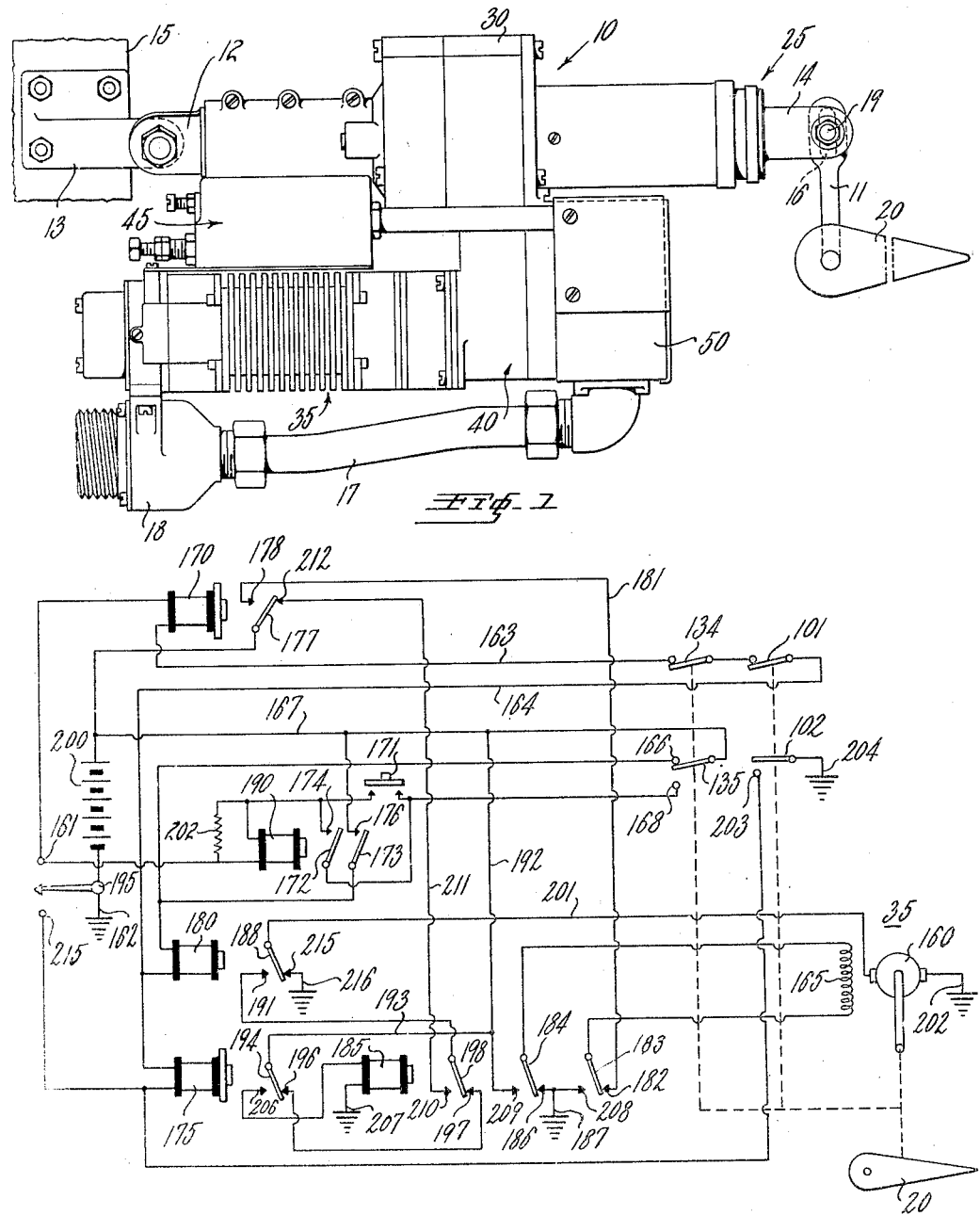
Fig. 1 is a schematic elevational view of an automatic wing flap actuator unit incorporating the principles of the present invention.

Referring to the drawings, Fig. 1 schematically illustrates the actuator unit of the present invention as arranged to control the position of a movable wing flap of an aircraft. For this purpose, actuator 10 is secured at one end to a fixed portion 15 of the aircraft, such as the internal structure of a wing, and at the other end to an operating arm 11 connected to a wing flap 20. The actuator comprises a ball bearing screw jack 25 mounted in a housing 30 and operated by a motor 35 through the medium of reduction gearing contained in a housing 40. In a manner to be described more fully hereinafter, a torque responsive switch unit 45 is connected to the inner end of the actuator and a second switch unit 50 containing limit switches and an impulsing switch is secured to gear housing 40.

A mounting member 12 is adjustably secured to the inner end of the actuator and connected to a bracket 13 mounted on fixed surface 15. The jack screw comprises a pair of relatively extensible members including a screw fixed against rotation and having secured to its outer end a mounting member 14 provided with a bolt and nut 19 extending through an elongated slot 16 in arm 11. The electrical connections to the actuator are made through a conduit 17 provided with a coupling element 18 for connection of the actuator motor and switches in a control system.

Referring to Fig. 2 of the drawing, motor 35 may be a small, high speed, direct current motor having an output pinion 21 disposed in gear housing 40. Output pinion 21 drives jack screw 25 through the medium of gearing generally indicated at 22. Specifically, pinion 21 meshes with a spur gear 23 secured to a shaft 24 mounted in bearings in housing 40. A pinion 26 on shaft 24 drives a spur gear 27 on a shaft 28 mounted in bearings in housing 40.

A pinion 31 on shaft 28 meshes with the drive gear 32 of a torque transmission unit 55 of the type described and claimed in the copending application of John M. Wehner Serial No. 582,951, filed March 15, 1945, now abandoned, for Irreversible torque transmitter, and assigned to the assignee of the present application. Torque transmission unit 55 will be described more fully hereinafter in connection with Fig. 8 of the drawing. Driven pinion 33 of unit 55 is mounted on a shaft 34 coupled to the drive shaft 36 of switch unit 50. The operation of switch unit 50 likewise will be described more fully hereinafter.

Output pinion 33 of device 55 meshes with gear 37 secured to elongated nut 38 forming part of jack screw 25. Nut 38 is mounted on bearing 41 in housing 30, and its outer end 42 is screw threaded for cooperative engagement with screw 14. Ball bearings are disposed between the threads of screw 14 and the internal threads of nut extension 42. During rotation of nut 38, these ball bearings travel along the threads of screw 14 and nut extension 42 and when they reach either end of their path of travel, are returned to the other end through an external conduit 43 secured to the outer surface of nut extension 42 by clamps 44.

Housing 30 comprises a central section 46, and a pair of end members 47 and 48 secured to section 46 by studs 51 and 52, respectively. Nut 38 is mounted in end plate 48 through the medium of an anti-friction bearing 53.

Mounting member 12 includes a tubular extension 54 having a shoulder 56 engaging a recess in end plate 47. The mounting member is angularly adjustable with respect to housing 30 and is retained in adjusted position with respect thereto in a manner described more fully hereinafter. The inner end of screw 14 is enclosed in a tubular extension 57 having bearing engagement in tubular extension 54 of mounting member 12. It will be noted that the entire jack assembly 25 is movable linearly a limited amount relative to housing 30, as indicated by the clearance between gear 37 and the housing.

Screw 14 is held against rotation, as by connection of mounting member 14 to arm 11 to operate wing flap 20. Accordingly, when motor 35 is energized in either direction, torque therefrom is transmitted through torque transmission unit 55 to rotate gear 37 and thus nut 38. Such rotation effects extension and retraction of screw 14 relative to housing 30.

To protect the jack assembly from ingress of foreign material, means are provided for enclosing screw 14 throughout its entire range of movement. These means comprise a plurality of telescoping sleeves 61, 62 and 63. Sleeve 61 is secured at its inner end to housing 30, and at its outer end is provided with a gasket 64 engaging sleeve 62. Sleeve 62 has a flange 65 at its inner end and is provided at its outer end with a gasket 66 engaging sleeve 63. Sleeve 63 is provided with a flange 67 at its inner end and at its outer end is secured to nut 68 threaded on the end of screw 14 and held in position by pin means extending through an aperture 70.

Tubular extension 54 of mounting member 12 is provided with an aperture 71 aligned with an aperture 72 in the top wall of switch unit 45. A plate 73 is mounted on a series of roller bearings 74 engaging a plate 75 adjacent the outer end of tubular extension 54. A switch arm 76 extends through apertures 71, 72 from switch housing 45 into tubular extension 54 of mounting member 12. A roller bearing 77 is disposed centrally of extension 57 and engages arm 76. Another roller bearing 78 is disposed between plate 73 and arm 76, but is offset with respect to roller 77. Therefore, upon movement of jack screw 25 linearly of housing 30, the offset arrangement of rollers 77, 78, together with the roller bearing mounting of plate 73 and plate 75, will effect a swinging movement of arm 76 in a counter-clockwise direction. Such swinging movement of arm 76 is utilized to control the energization of motor 35, as will be made clear hereinafter.

Figure 3:
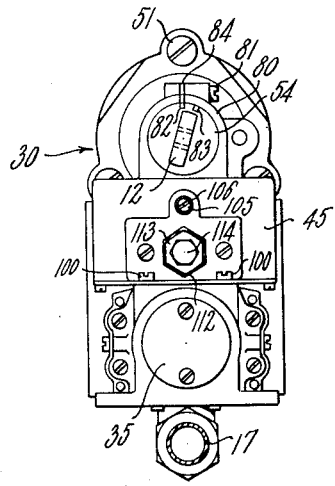
Fig. 3 is an elevational view of the left end of the actuator shown in Fig. 2.

Switch unit 45 is provided with a split clamp portion 80, as seen more clearly in Figs. 2 and 3. Clamp portion 80 surrounds extension 54 of mounting member 12, and the clamp may be tightened by a plurality of studs 81. Extension 54 is formed with a pair of notches 82 and 83 offset angularly with respect to the plane of mounting member 12. A key 84 provided with an aperture 85 is disposed between the ends of clamp 80 and adapted to engage in either one of the notches 82 or 83 for angularly adjusting the position of mounting member 12 with respect to housing 30. Key 84 is retained in place by engagement of a stud 81 with aperture 85. This arrangement provides for mounting of actuator unit 10 for driving in a right-hand direction or a left-hand direction, where offset mounting surfaces 15 are provided.

Means are provided for mechanically limiting the movement of screw 14 with respect to nut 38 in either direction. Referring to Figs. 2, 4 and 5, the inner end of screw 14 is formed with four perpendicularly related notches 79. An abutment member 86 provided with an extension 87 is secured to the inner end of screw 14 by a stud 88 engaging a threaded recess 90 in the inner end of the screw. Notches 79 provide for adjustment of abutment member 86 to any one of four positions with respect to the inner end of screw 14. When screw 14 nears the limit of its extension, extension 87 of abutment member 86 will engage a shoulder 91 on abutment member 92 secured in the outer end of nut 38.

The inner face of nut 68, which is secured to the outer end of screw 14, is formed with six equally spaced notches 93 which receive an extension 94 on abutment member 95 mounted on the threaded end 96 of screw 14. Extension 94 of abutment member 95 is adapted to engage shoulder 97 formed on the outer end of nut 38 when screw 14 has reached the limit of its inward movement with respect to nut 38. The six notches 93 provide six positions of adjustment for abutment member 95 with respect to screw 14.

Switch unit 45 comprises a housing 98 secured by studs 100 to motor 35. A pair of switches 101 and 102 are mounted in housing 98. Preferably, these switches are snap action, high current capacity switches operated by plungers 103 and 104, respectively. Switch 102 is relatively fixed in housing 98. Switch 101 is slidably mounted in the housing for longitudinal movement thereof, being adjusted in position through the medium of a screw 105 provided with a lock nut 106. Operating arm 76, referred to previously, is provided with a cylindrical boss 107 intermediate its ends and adapted to engage either plunger 103 or 104. Normally, arm 76 depresses plunger 103 to retain switch 101 closed.

The lower end of operating arm 76 is forked as at 108 and straddles a reduced section 110 of a tubular threaded bolt 111. Bolt 111 is threaded through a nut 112 mounted in the wall of housing 98, and provided with a lock nut 113. A bolt 114 provided with a lock nut 115 extends centrally of bolt 111 and has a nut 116 secured to its outer end and held against movement by a wire loop 117. A pair of spring seat collars 118 and 120 are mounted on bolt 114 and a coil spring 121 surrounds the bolt and seats on each of the collars. Collar 120 bears against the inner end of bolt 111 and collar 118 bears against fork 108 of arm 76. By adjustment of bolt 114 relative to bolt 111, the force of spring 121 urging collar 118 against the lower end of arm 76 may be adjusted.

The operation of this portion of the unit is as follows. When the torque on jack screw 25 attains a predetermined value, the jack screw, as a unit, will move linearly of housing 30. Due to the offset relation of rollers 77 and 78, arm 76 will be pivoted in a counterclockwise direction. The arm will thus permit outward movement of plunger 103 to open switch 101. This deenergizes motor 35, stopping movement of wing flap 20 in an extending direction. When the torque on jack 25 drops a predetermined amount, spring 121 moves arm 76 clockwise to depress plunger 103 and close switch 101 to reenergize motor 35. When the torque on jack screw 25 attains a higher value, arm 76 depresses plunger 104 to operate switch 102 to effect circuit connection for reverse movement of motor 35 and retraction of jack screw 25 and thus of wing flap 20. When the torque on jack screw 25 drops a predetermined amount below such higher value, spring 121 swings arm 76 clockwise to release plunger 104 and break the reverse energization circuit of motor 35. The manner in which this occurs will be described more fully hereinafter, in connection with the description of Fig. 9.

Switch unit 50 forms an important part of the present invention. Referring more particularly to Figs. 2, 6 and 7, the unit includes a central bearing portion 124 having a shaft 125 extending transversely thereof. Operating shaft 36 (Fig. 2) extends longitudinally of housing 30 and drives shaft 125 through a worm and worm wheel or a pair of spiral gears (not shown). Referring more particularly to Figs. 2 and 6, a disk 126 is rotatable on the outer end of shaft 125 and carries a pair of diametrically opposite brackets 127, 128. Brackets 127, 128 adjustably support studs 130, 131 which are operatively associated with the operating plungers 132, 133 of a pair of snap action switches 134, 135. Switches 134, 135 are limit switches determining the limits of operation of wing flap 20, and effect deenergization of motor 35 when the wing flap reaches either limit of operation.

Disk 126 carries an abutment 136 on its inner surface. A second disk 137 is secured to rotate with shaft 125 adjacent disk 126 and carries an abutment 138. At either limit of operation of wing flap 20, abutment 138 engages abutment 136 to oscillate disk 126 and depress one of the plungers 132 or 133, depending upon the direction of oscillation, to open one of the switches 134 or 135 to deenergize motor 35.

As referred to previously, the actuator unit of the present invention may well be used in a synchronizing system of the type described and claimed in Schall et al. application Serial No. 545,330. The synchronizing system described and claimed in said application includes impulsing means for providing current impulses for a plurality of motors in order to maintain the same in synchronous relation. For this purpose, a third switch 140 is mounted in switch unit 50 adjacent the other end of shaft 125. Switch 140 is provided with an operating plunger 141 adapted to be engaged by a stud 142 adjustably mounted in the outer end of an arm 143 pivoted on bearing support 124. A pin 144 extends axially inwardly from arm 143 and is in engagement with a notched wheel 145 secured for rotation with shaft 125. Accordingly, during rotation of shaft 125, switch 140 will be successively opened and closed by the oscillation movement imparted to arm 143 through the medium of pin 144 and notched wheel 145.

Torque transmission unit 55 is shown more clearly in Figs. 2 and 8, and is of the type described and claimed in the aforementioned Wehner application Serial No. 582,951, now abandoned. This unit comprises driven gear 32 having a plurality of arcuate axially extending ribs 146 disposed thereon and engaging the inner surface of a fixed member 147. Driven shaft 34 has secured thereto a driven or cam member 148 provided with cam surfaces 150. Between cam surfaces 150, driven member 148 is formed with radially projecting ribs 151 apertured to receive springs 152. Ribs 151 alternate with ribs 146, and a plurality of ball bearings 153 are each disposed between one rib 152 and the adjacent end of a rib 146. Springs 151 normaly urge balls 153 outwardly away from ribs 152 into engagement with the ends of ribs 146.

The torque transmission unit operates in the following manner. Upon energization of motor 35 for rotation in either direction, gear 32 rotates and its ribs 146 urge balls 153 toward the lower portions of cam surface 150 and into engagement with ribs 152. There is thus a direct mechanical drive between ribs 146 and ribs 152 and thus between gear 32 and pinion 33 secured to shaft 34.

When reverse torque is applied in either direction to jack screw 25, gear 37 tends to rotate pinion 33. This in turn tends to rotate cam member 148. Such rotation of cam member 148 brings the high portions of the cam surfaces into engagement with balls 153. Therefore, balls 153 are wedged between cam surfaces 150 and fixed member 147, effectively locking the torque transmission unit 55, and thus gearing 22, motor 35 and jack screw 25, against movement.

Fig. 9 is a schematic electrical diagram illustrating a control circuit for the actuator unit of the invention. In order to simplify the drawing, the control circuit elements cooperating with impulsing switch 140 for connecting motor 35 in a synchronizing arrangement with the motors of other actuators, have been omitted. These connections are identical with those described and claimed in the copending application of Schall et al. Serial No. 545,330 referred to above. Preferably, motor 35 is a shunt motor comprising an armature 160 and a shunt field winding 165. Energization of motor 35 is controlled by a plurality of relays 170, 175, 180, 185 and 190. The control circuit also includes down limit switch 134, up limit switch 135, and torque responsive switches 101 and 102. In the figure, all of the relays are shown in the deenergized position, the limit switches are shown closed and the torque responsive switches in their normal position.

Assuming that wing flap 20 is in its upper or retracted position and it is desired to lower the same. In such position, up limit switch 135 will be open due to the wing flap having reached its upper limit of movement. Control switch 195 is moved to engage its "down" contact 161. This connects one terminal of "down" relay 170 to ground at 162. The other terminal of relay 170 is connected, through conductor 163, switches 134 and 101 and conductor 164 to one terminal of relay 180. The other terminal of relay 180 is connected to terminal 166 of up limit switch 135. The blade of switch 135 is connected, through conductor 167, to the positive terminal of a suitable source of direct current 200 which may be the usual 28 volt aircraft battery or generator.

However, as wing flap 20 is in its upper position, switch 135 is disengaged from its contact 166 and is engaged with its back contact 168. To complete the energizing circuit for relays 170 and 180, a supplemental circuit is provided including a push button 171. When push button 171 is depressed, it connects one terminal of relay 190 through back contact 168 of switch 135 and conductor 167 to the positive terminal of source 200. The other terminal of relay 190 is connected to contact 161 of switch 195 and thus to ground 162. Accordingly, relay 190 is energized, engaging its armatures 172 and 173 with their front contacts 174 and 176, respectively. This connects the other terminal of relay 180 to the positive terminal of source 200 through armature 173, contact 176 and conductor 167. Accordingly, relays 170 and 180 are energized. It should be noted that relay 170 is of the slow release type, for a purpose to be described hereinafter.

When energized, relay 170 engages its armature 177 with its front contact 178. This closes an energizing circuit for shunt field winding 165 as follows. Positive terminal of source 200, relay armature 177, contact 178, conductor 181, back contact 182 of relay 185, relay armature 183, shunt field winding 165, armature 184 of relay 185, back contact 186 and ground 187, which is electrically identical with ground 162. At the same time, relay 180 engages its armature 188 with its front contact 191. This completes the circuit for motor armature 160 as follows: positive terminal of source 200, conductor 167, conductor 192, conductor 193, armature 194 of relay 175, back contact 196, back contact 197 of relay 185, relay armature 198, front contact 191 and armature 188 of relay 180, conductor 201, motor armature 160 and ground 202, which is also electrically identical with ground 162. Motor 160 is thus energized in a direction to move wing flap 20, through jack screw 25, in a downward direction.

It should be noted that even though push button 171 is depressed only momentarily, relay 190 is maintained closed over a shunt circuit including its armature 172 and front contact 174. Armature 172 is connected to back contact 168 of switch 135 and contact 174 is connected to one terminal of relay 190. To limit the current flow through relay 190, a resistance 202 is connected in shunt therewith.

With motor 35 thus energized, jack screw 25 is operated in a direction to move the wing flap 20 downwardly. After a small movement of flap 20, switch 135 disengages contact 168 and engages contact 166, breaking the holding circuit for relay 190. Unless the torque on jack screw 25 exceeds certain predetermined values, such downward movement continues until limit switch 134 opens, which breaks the circuit for relays 170 and 180, deenergizing motor 35. Torque responsive switches 101, 102 are adapted to be operated by arm 76 when the torque on jack screw 25 attains certain preselected values. In a practical embodiment, the torque for operating switch 101 might be from 1400 to 1600 inch pounds, and that for operating switch 102 might be a higher value, for instance, from 1545 to 1745 inch pounds. In each instance, when the torque on the jack screw attains such values, switches 101 and 102 are respectively moved from the position shown in Fig. 9 to their opposite position. When the torque on the jack screw drops below such preattained values by a predetermined differential, such as 100 pounds, the switches move back to the position shown in Fig. 9.

Assuming that the torque on jack screw 25 attains a value in excess of 1400 inch pounds, arm 76 will pivot counter-clockwise, disengaging plunger 103 of switch 101 and this switch will then open. This breaks the circuit for relays 170 and 180, deenergizing motor 35. Should, despite the fact that the wing flap is not being moved, the torque on jack screw 25 increase to exceed say 1545 pounds, arm 76 will move further in a counter-clockwise direction to depress plunger 104 of switch 102 and move this switch to engage its back contact 203. This energizes motor 35 for operation in reverse direction to raise flap 20, in a manner to be presently described.

Assuming that switch 101 has been opened, if the torque on the jack screw drops 100 pounds or more below the predetermined torque necessary to operate switch 101, switch 101 will again close to reenergize relays 170 and 180 which in turn completes the circuit for motor 35 for operation of wing flap 20 in a downward direction. Such movement continues either until such time as the torque limit switch 101 opens again or final limit switch 134 is opened.

When switch 102 is operated, motor 35 is energized under the control of slow release "up" relay 175. Engagement of switch 102 with its back contact 203 connects one terminal of relay 175 to ground 204 which is electrically identical with ground 162. The other terminal of relay 175 is connected to the positive terminal of source 200 through relay 180, up limit switch 135 and conductor 167. As stated, up limit switch 135 will have disengaged contact 168 and engaged its front contact 166 a short interval after downward movement of flap 20 begins. Such engagement, of course, breaks the holding circuit for relay 190 whose elements resume the position shown in Fig. 9.

Energization of relay 180 energizes motor armature 160 in the same manner as when the relay is closed in cooperation with relay 170. Relay 175 in closing, engages its armature 194 with its front contact 206. This completes an energizing circuit for relay 185, which has a terminal connected to ground 207, electrically identical with ground 162. Relay 185 engages its armatures 183, 184 and 198 with their front contacts 208, 209 and 210, respectively. Contact 210 is connected to the positive terminal of source 200 through conductor 211, back contact 212 and armature 177 of relay 170. Accordingly, contact 191 of relay 180 remains connected to the positive terminal for proper energization of motor armature 160. Contact 209 is connected to the positive terminal of source 200 through conductors 192 and 167. Accordingly, shunt field winding 165 is energized over the following circuit from contact 209: relay armature 184, field winding 165, relay armature 183, contact 208 and ground 187. Motor 35 is thus energized in a direction to effect movement of wing flap 20 in an upward direction. Such movement continues until such time as the torque on jack screw 25 drops the predetermined differential, such as 100 pounds, below the torque necessary to operate switch 102. When the torque has dropped such predetermined differential, switch 102 opens, deenergizing relays 175 and 180 and stopping further upward movement of wing flap 20.

Flap 20 may be operated under manual control to an upward position by engagement of switch 195 with its "up" contact 215, which is connected to the same terminal of relay 175 as is the back contact 203 of switch 102. Accordingly, motor 35 is energized for upward movement in the same manner under control of switch 195 as under control of switch 102.

When motor 35 is deenergized through opening of either of relays 170 or 175, a dynamic braking circuit is effected for the motor, to provide quick stopping thereof. As previously stated relays 170 and 175 are slow release relays, whereas relay 180 is an ordinary quick release relay. Hence, in the event of the motor circuit being broken, contact 188 of relay 180 will be engaged with its back contact 215 connected to ground 216 before contact 177 of relay 170 is disengaged from front contact 178, or armature 194 of relay 175 is disengaged from front contact 206.

Relay 180 controls the armature energization circuit. One terminal of the armature, as previously stated, is connected to ground at 202. When relay armature 188 engages back contact 215, the other terminal of the armature is likewise connected to ground. In effect, armature 160 is shunted to ground. This shunting action takes place immediately upon opening of one of the control switches controlling the energization of the motor. Relays 170 and 175 control the energization of shunt field winding 165.

Assuming that the motor is operating in a "down" direction, whereupon relay armature 177 is engaged with front contact 178 of relay 170. If one of the control switches opens, armature 160 of motor 35 will immediately be shunted. However, relay 170 will remain energized for a short interval due to its slow release action and therefore the energization of shunt field winding 165 will be maintained. This effects a dynamic braking for motor 35 which quickly brings the motor armature to a stop. After an interval, relay 170 disengages its armature 177 from its front contact 178 breaking the energizing circuit for field winding 165.

If the motor is operating in the "up" direction, the circuit for field winding 165 is controlled by relay 185 and the energization of relay 185 is in turn controlled by relay 175. If one of the control switches now opens, motor armature 160 will be shunted through relay armature 188 and its associated back contact. However, relay 175 remains energized for a short interval. It thus maintains relay 185 energized which, in its energized position, maintains the energizing circuit for shunt field winding 165. The dynamic braking circuit is again completed for motor 35, bringing armature 160 quickly to a stop. After a predetermined interval, relay 175 opens, in turn deenergizing relay 185 to break the energizing circuit for field winding 165.

The described actuator provides effective means for automatically controlling the position of a movable element such as an aircraft wing flap in accordance with the torque exerted on such element. For instance, should the air pressure against the flap exceed a predetermined value during downward movement of the flap, such downward movement is automatically stopped. If the torque attains a higher value, the flap is moved upwardly until such time as the air pressure drops to a predetermined safe value. The novel torque responsive mechanism including the movable actuator 25, and operating arm 76 controlling switches 101 and 102 provides a very effective and sensitive control of the actuator. The torque values may be suitably adjusted, as previously described, through the medium of screw 114 which varies the pressure of spring 121 acting on arm 76. Small power is required to operate the actuator due to the ball bearing nut and screw arrangement used therewith. Additionally, the inclusion of torque transmission unit 55 prevents any reverse movement of the flap due to pressure being exerted thereon, as such unit provides for transmission of torque only from motor 35 to jack screw 25 and that in the reverse direction.

While a specific embodiment of the invention has been shown and described in detail to illustrate the application of the principles thereof, it will be understood that the invention may be otherwise embodied without departing from such principles.

What is claimed is:

1. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a pair of switch means controlling the energization of said motor; a member operatively associated with said switch means and engaging said actuator; means interconnecting said member and actuator operable, when the load on said actuator attains preselected values to move said member relatively to said actuator to selectively operate said switch means to alter the energization of said motor; and means associated with said member opposing movement thereof and of said actuator linearly of said housing.

2. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a pair of switch means controlling the energization of said motor; a member operatively associated with said switch means and engaging said actuator; means interconnecting said member and actuator operable, when the load on said actuator attains preselected values to move said member relatively to said actuator to selectively operate said switch means to alter the energization of said motor; means associated with said member opposing movement thereof and of said actuator linearly of said housing; a pair of limit switches also controlling the energization of said motor; and operating mechanism coupled to said motor and effective to selectively open said limit switches at either limit of operation of said actuator.

3. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a pair of switch means controlling the energization of said motor; a member operatively associated with said switch means and engaging said actuator; means interconnecting said member and actuator operable, when the load on said actuator attains preselected values to move said member relatively to said actuator to selectively operate said switch means to alter the energization of said motor; means associated with said member opposing movement thereof and of said actuator linearly of said housing; and a torque transmission device interposed between said motor and said actuator and operable, upon energization of said motor for rotation in either direction, to transmit torque from said motor to said actuator; said device, upon application of reverse torque to said actuator in either direction, locking said actuator against movement.

4. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a pair of switch means controlling the energization of said motor; a member operatively associated with said switch means and engaging said actuator; means interconnecting said member and actuator operable, when the load on said actuator attains preselected values to move said member relatively to said actuator to selectively operate said switch means to alter the energization of said motor; means associated with said member opposing movement thereof and of said actuator linearly of said housing; and a torque transmission device comprising a driving element coupled to said motor, a driven element coupled to said actuator, wedging means disposed between said driving element and said driven element, and a fixed member operatively associated with said wedging means; said wedging means, upon energization of said motor for rotation in either direction, transmitting torque from said driving element to said driven element and, upon application of reverse torque to said actuator in either direction, engaging said fixed member to lock said driven element and said actuator against movement.

5. An actuator unit, adapted for operation in synchronism with other similar units, comprising, in combination, a housing; a linear actuator mounted in said housing; an electric motor coupled to said actuator for effecting extension and retraction thereof relative to said housing; a pair of switch means controlling the energization of said motor; a member operatively associated with said switch means and engaging said actuator; means interconnecting said member and actuator operable, when the load on said actuator attains preselected values to move said member relatively to said actuator to selectively operate said switch means to alter the energization of said motor; a pair of limit switches also controlling the energization of said motor; operating mechanism coupled to said motor and effective to selectively open said limit switches at either limit of operation of said actuator; and an impulsing switch coupled to said operating mechanism and arranged to be connected in electric circuit relation with similar impulsing switches included in such other similar units to effect synchronous operation of all the actuator units.

6. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a pair of switch means controlling the energization of said motor; a member operatively associated with said switch means and engaging means interconnecting said member and actuator operable; said actuator, when the load on said actuator attains preselected values to move said member relatively to said actuator to selectively operate said switch means to alter the energization of said motor; and a spring associated with said member and opposing movement thereof and of said actuator linearly of said housing.

7. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a control box secured to said housing; a pair of switch means mounted in opposed relation in said control box; an operating arm pivotally mounted in said housing and engaging said actuator, said arm extending into said control box between said switch means; said actuator, when the torque thereon attains preselected values, moving linearly of said housing, as a unit, to swing said arm to selectively operate said switch means to alter the energization of said motor; and a spring in said control box engaging said arm to resist swinging thereof and such movement of said actuator linearly of said housing.

8. An actuator unit comprising, in combination, a housing; mounting means adjustably secured to one end of said housing for connecting the same to a relatively fixed point; a linear actuator mounted in said housing; mounting means secured to the outer extensible end of said actuator for connecting the same to a member mounted for movement relative to such relatively fixed point; an electric motor coupled to said actuator for effecting extension and retraction thereof relative to said housing; a control box secured to said housing; a pair of switch means mounted in opposed relation in said control box; a plate in said housing spaced from the inner end of said actuator; anti-friction means between said plate and housing providing for movement of said plate transversely of said housing; an arm disposed between said plate and the inner end of said actuator; anti-friction elements between said arm and said plate and said arm and the inner end of said actuator, said elements being relatively offset with respect to each other; said actuator, when the torque thereon attains preselected values, moving linearly of said housing, as a unit, to swing said arm to selectively operate said switch means to alter the energization of said motor; a spring in said control box engaging said arm to resist swinging thereof and such movement of said actuator linearly of said housing; and means for adjusting the force exerted by said spring to preselect such torque values.

9. An actuator unit comprising, in combination, a housing; a linear actuator mounted in said housing, said actuator comprising a screw fixed against rotation relative to said housing, a nut and anti-friction elements disposed between said screw and said nut; abutments formed adjacent each end of said nut; abutment members carried adjacent each end of said screw and adapted to respectively engage said abutments at each limit of movement of said screw relative to said nut; an electric motor mounted on said housing; reduction gearing coupling said motor to said nut to rotate the same to extend and retract said screw; and a torque transmission device interposed between elements of said gearing and comprising a driving element coupled to said motor, a driven element coupled to said actuator, wedging means disposed between said driving element and said driven element, and a fixed member operatively associated with said wedging means; said wedging means, upon energization of said motor for rotation in either direction, transmitting torque from said driving element to said driven element and, upon application of reverse torque to said actuator in either direction, engaging said fixed member to lock said driven element and said actuator against movement.

10. An actuator unit comprising, in combination, a housing; a linear actuator mounted in said housing, said actuator comprising a screw fixed against rotation relative to said housing, a nut and anti-friction elements disposed between said screw and said nut; abutments formed adjacent each end of said nut; abutment members adjustably mounted adjacent each end of said screw and adapted to respectively engage said abutments at each limit of movement of said screw relative to said nut; an electric motor mounted on said housing; reduction gearing coupling said motor to said nut to rotate the same to extend and retract said screw; and a torque transmission device interposed between elements of said gearing and comprising a driving element coupled to said motor, a driven element coupled to said actuator, wedging means disposed between said driving element and said driven element, and a fixed member operatively associated with said wedging means; said wedging means, upon energization of said motor for rotation in either direction, transmitting torque from said driving element to said driven element and, upon application of reverse torque to said actuator in either direction, engaging said fixed member to lock said driven element and said actuator against movement.

11. An airplane wing flap actuator system comprising in combination a jackscrew actuator including two relatively axially movable, threadedly engaged members respectively coupled to the wing flap and the fixed wing surface for positioning the flap relative to the surface; power means coupled to the actuator for effecting movement of the flap between two extreme positions thereof, first switch means including a device operable in response to axial movement of one of said members when the torque on the actuator attains a first preselected value, during energization of said power means to move the wing flap toward one position, to effect deenergization of said motor, and second switch means operable by said one of said members when the torque thereon attains a higher preselected value to effect energization of said motor to retract the flap toward the other of its said positions, said device including an arm, a pivot intermediate said arm and one of said members and a second pivot intermediate said arm and the other of said members, the said pivots being offset with respect to each other about a line corresponding to the direction of relative axial movement of said members, both said switch means being under the control of said arm.

12. An airplane wing flap actuator system comprising in combination a jackscrew actuator including two relatively axially movable, threadedly engaged members respectively coupled to the wing flap and the fixed wing surface for positioning the flap relative to the surface; power means coupled to the actuator for effecting movement of the flap between two extreme positions thereof, first switch means including a device operable in response to axial movement of one of said members when the torque on the actuator attains a first preselected value, during energization of said power means to move the wing flap toward one position, to effect deenergization of said motor, and second switch means operable by said one of said members when the torque thereon attains a higher preselected value to effect energization of said motor to retract the flap toward the other of its said positions, said device including an arm, one of said members being subdivided at a point intermediate its length to define a space for reception of said arm, a pair of pivots each intermediate said arm and one of the two faces defining said space, the said pivots being offset with respect to each other about a line corresponding to the direction of relative axial movement of said members, both said switch means being under the control of said arm; a pair of limit switches also controlling the energization of said motor; and operating mechanism coupled to said power means to selectively open said limit switches at either limit of operation of said actuator.

WILLIAM P. LEAR.

REFERENCES CITED

The following references are of record in the file of this patent:

UNITED STATES PATENTS

| Number | Name | Date |
| --- | --- | --- |
| 1,905,522 | Stephenson | Apr. 25, 1933 |
| 2,052,125 | Brady | Aug. 25, 1936 |
| 2,114,013 | Ball | Apr. 12, 1938 |
| 2,156,976 | Fischel | May 2, 1939 |
| 2,300,022 | Swartz | Oct. 27, 1942 |
| 2,313,995 | Hunter | Mar. 16, 1943 |
| 2,316,235 | Gast | Apr. 13, 1943 |
| 2,317,529 | Hodgson et al. | Apr. 27, 1943 |
| 2,328,897 | Gill | Sept. 7, 1943 |
| 2,361,439 | Weiss | Oct. 31, 1944 |
| 2,375,422 | Leland | May 8, 1945 |
| 2,386,521 | Watters | Oct. 9, 1945 |
| 2,398,841 | Morris | Apr. 23, 1946 |
| 2,403,092 | Lear | July 2, 1946 |
| 2,429,901 | Spraragen | Oct. 28, 1947 |